US010069977B2

(12) United States Patent
Cao et al.

(10) Patent No.: US 10,069,977 B2
(45) Date of Patent: Sep. 4, 2018

(54) METHOD AND DEVICE FOR CONTROLLING CALL FORWARDING

(71) Applicant: ZTE Corporation, Shenzhen (CN)

(72) Inventors: Wei Cao, Shenzhen (CN); Yuna Zhu, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 0 days.

(21) Appl. No.: 15/528,212

(22) PCT Filed: May 29, 2015

(86) PCT No.: PCT/CN2015/080361
§ 371 (c)(1),
(2) Date: May 19, 2017

(87) PCT Pub. No.: WO2016/078386
PCT Pub. Date: May 26, 2016

(65) Prior Publication Data
US 2017/0324870 A1 Nov. 9, 2017

(30) Foreign Application Priority Data
Nov. 19, 2014 (CN) .......................... 2014 1 0663711

(51) Int. Cl.
*H04M 3/42* (2006.01)
*H04M 3/54* (2006.01)
(Continued)

(52) U.S. Cl.
CPC .......... *H04M 3/543* (2013.01); *H04M 3/4365* (2013.01); *H04W 4/16* (2013.01); *H04W 12/12* (2013.01)

(58) Field of Classification Search
CPC ..... H04M 3/543; H04M 3/4365; H04W 4/16; H04W 12/12
(Continued)

(56) References Cited

U.S. PATENT DOCUMENTS 6,128,503 A * 10/2000 Granberg ............ H04M 3/4217
455/433
7,095,838 B1 * 8/2006 Kanerva ................. H04M 3/38
379/196

(Continued)

FOREIGN PATENT DOCUMENTS

| CN | 101106817 A | 1/2008 |
| CN | 103841533 A | 6/2014 |
| CN | 103841534 A | 6/2014 |

OTHER PUBLICATIONS

International Search Report for corresponding application PCT/CN2015/080361 filed May 29, 2015; dated Sep. 8, 2015.

*Primary Examiner* — William Nealon
(74) *Attorney, Agent, or Firm* — Cantor Colburn LLP

(57) ABSTRACT

A method and device for controlling call forwarding are provided. In the method for controlling call forwarding, a call request is received, where the call request is sent when a second terminal takes a first terminal as a call forwarding destination; whether the first terminal permits reception of the call request forwarded from the second terminal or not is judged; and under a condition that a judgment result is that the first terminal does not permit the reception of the call request forwarded from the second terminal, the call request is denied.

15 Claims, 7 Drawing Sheets

(51) Int. Cl.
  *H04W 4/16*    (2009.01)
  *H04W 12/12*   (2009.01)
  *H04M 3/436*   (2006.01)
(58) Field of Classification Search
  USPC ........................................................ 455/417
  See application file for complete search history.

(56) References Cited

U.S. PATENT DOCUMENTS

2006/0136560 A1\* 6/2006 Jiang ....................... H04L 51/14
                                                            709/206
2015/0079937 A1\* 3/2015 Adachi ................. H04W 12/06
                                                            455/411

\* cited by examiner

METHOD AND DEVICE FOR CONTROLLING CALL FORWARDING

TECHNICAL FIELD

The present disclosure relates to the field of communications, and more particularly to a method and device for controlling call forwarding.

BACKGROUND

In a mobile communication network, a user A may use a terminal to register a call forwarding number, such as Call Forwarding Unconditional (CFU) or Call Forwarding Conditional (for example, call forwarding on busy, call forwarding on mobile subscriber not reachable and call forwarding on no reply), so that a call to the user A may be forwarded to a number C. That is, when another user dials a number of the user A, if a condition is met, the call is connected to a call forwarding party C and the call may be answered by the call forwarding party C. Some important incoming calls may be prevented from being missed under some conditions where the user A cannot answer the phone.

However, a mobile user, such as a user B, may use a terminal to input a number of any other user as a forwarding number of the user B without asking the other user for an agreement or permission when registering the forwarding number through the terminal, so that a malicious harassment may be caused.

SUMMARY

Some embodiments of the present disclosure provide a method and device for controlling call forwarding, so as to at least solve the problem of high malicious harassment rate due to the fact that no agreement or permission of others is required by call forwarding in a related call forwarding technology.

According to an embodiment of the present disclosure, a method for controlling call forwarding is provided, which may include the following acts. A call request is received, where the call request may be sent when a second terminal takes a first terminal as a call forwarding destination. Whether the first terminal permits reception of the call request forwarded from the second terminal or not is judged. Under a condition that a judgment result is that the first terminal does not permit the reception of the call request forwarded from the second terminal, the call request is denied.

In the embodiment of the present disclosure, the act that whether the first terminal permits the reception of the call request forwarded from the second terminal or not is judged may include the following act. Whether the first terminal permits the reception of the call request forwarded from the second terminal or not is judged according to a white list sent by the first terminal, where the white list may include one or more numbers for which a number of the first terminal is allowed to be set as a call forwarding number under a condition that the first terminal forbids call forwarding.

In the embodiment of the present disclosure, after judging whether the first terminal permits the reception of the call request forwarded from the second terminal or not according to the white list sent by the first terminal, the method may further include the following act. Under a condition that the judgment result is that the first terminal permits the reception of the call request forwarded from the second terminal, the call request is connected by taking the number of the first terminal as the call forwarding number.

In the embodiment of the present disclosure, the white list may be updated within a preset time.

In the embodiment of the present disclosure, before receiving the call request, the method may further include the following act. A query request sent by a second Home Location Register (HLR) to which the second terminal belongs is received, where the query request may be used for querying about whether the first terminal permits to be registered as the call forwarding destination by the second terminal or not. A query result is fed back to the second HLR according to the query request.

According to another embodiment of the present disclosure, a device for controlling call forwarding is provided, which may include:

a first receiving unit, arranged to receive a call request, where the call request may be sent when a second terminal takes a first terminal as a call forwarding destination;

a judgment unit, arranged to judge whether the first terminal permits reception of the call request forwarded from the second terminal or not; and a denial unit, arranged to deny the call request under a condition that a judgment result of the judgment unit is that the first terminal does not permit the reception of the call request forwarded from the second terminal.

In the embodiment of the present disclosure, the judgment unit may further be arranged to judge whether the first terminal permits the reception of the call request forwarded from the second terminal or not according to a white list sent by the first terminal, where the white list may include one or more numbers for which a number of the first terminal is allowed to be set as a call forwarding number under a condition that the first terminal forbids call forwarding.

In the embodiment of the present disclosure, the device for controlling call forwarding may further include: a connecting unit, further arranged to connect, under a condition that the judgment result of the judgment unit is that the first terminal permits the reception of the call request forwarded from the second terminal, the call request by taking the number of the first terminal as the call forwarding number.

In the embodiment of the present disclosure, the device for controlling call forwarding may further include: an updating unit, arranged to update the white list within a preset time.

In the embodiment of the present disclosure, the device for controlling call forwarding may further include:

a second receiving unit, arranged to receive a query request sent by a second HLR to which the second terminal belongs, where the query request may be used for querying about whether the first terminal permits to be registered as the call forwarding destination by the second terminal or not; and a sending unit, arranged to feed back a query result to the second HLR according to the query request.

According to the embodiments of the present disclosure, whether the first terminal permits reception of the call request forwarded from the second terminal or not is judged when the call request is received and the call request is further denied under a condition that the judgment result is that the first terminal does not permit the reception of the call request forwarded from the second terminal. The problem of high malicious harassment rate due to the fact that no agreement or permission of others is required by call forwarding in the related call forwarding technology is solved, and an effect of reducing harassments is further achieved.

BRIEF DESCRIPTION OF THE DRAWINGS

The drawings described here are adopted to provide a further understanding to the present disclosure, and form a part of the present disclosure. In the drawings.

DETAILED DESCRIPTION OF THE EMBODIMENTS

The present disclosure will be described below in detail with reference to the drawings and embodiments. It is important to note that the embodiments in the present disclosure and characteristics in the embodiments may be combined under the condition of no conflicts.

Other characteristics and advantages of the present disclosure will be elaborated in the following specification, and moreover, partially become apparent from the specification or are understood by implementing the embodiments of the present disclosure. The purpose and other advantages of the present disclosure may be implemented and achieved through structures particularly specified in the written specification, claims and drawings.

Figure 1:
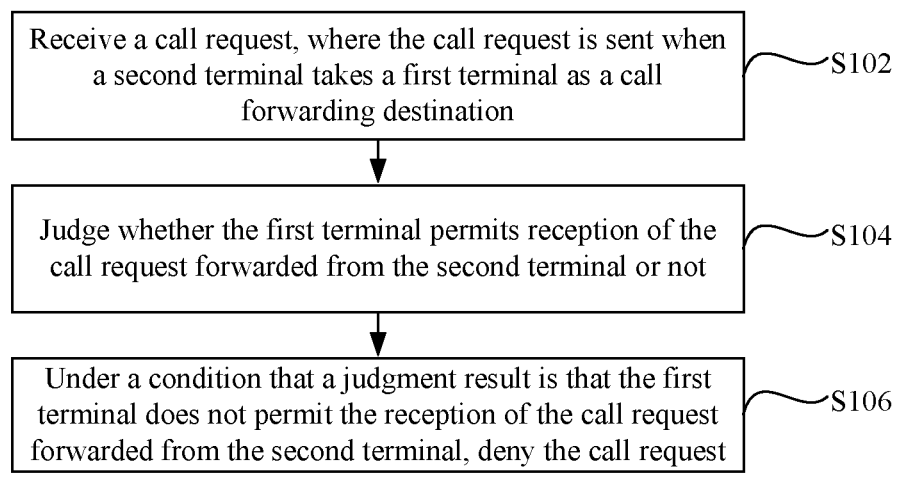
FIG. 1 is a flowchart of a method for controlling call forwarding according to an embodiment of the present disclosure.

An embodiment of the present disclosure provides a method for controlling call forwarding. As shown in FIG. 1, the method may include the following acts S102 to S106.

At act S102, a call request is received, where the call request is sent when a second terminal takes a first terminal as a call forwarding destination.

At act S104, whether the first terminal permits reception of the call request forwarded from the second terminal or not is judged.

At act S106, under a condition that a judgment result is that the first terminal does not permit the reception of the call request forwarded from the second terminal, the call request is denied.

In the embodiment of the present disclosure, when a first HLR to which the first terminal belongs receives the call request, whether the first terminal permits the reception of the call request forwarded from the second terminal or not is checked. When a result is that the first terminal does not permit the reception of the call request forwarded from the second terminal, the call request is denied, where the call request is sent when the second terminal takes the first terminal as the call forwarding destination. Therefore, occurrence of the condition of malicious harassment caused by the second terminal to a contentious terminal is prevented.

There may be multiple manners for judging whether the first terminal permits the reception of the call request forwarded from the second terminal or not. For example, when all forwarded calls are denied, denial messages may be fed back only by judging the forwarded calls. If only a part of numbers is to be denied, a denied list may be set. For example, whether the first terminal permits the reception of the call request forwarded from the second terminal or not may be judged according to a white list sent by the first terminal. The white list may include one or more numbers for which a number of the first terminal is allowed to be set as a call forwarding number under a condition that the first terminal forbids call forwarding.

Specifically, the first terminal may set the white list in the first HLR, to which the first terminal belongs, to permit some numbers as exceptions, for which the number of the first terminal is permitted to be set as the call forwarding number under a condition that the first terminal forbids call forwarding. In this way, flexibility of a call forwarding forbidding service is improved.

In the embodiment of the present disclosure, after judging whether the first terminal permits the reception of the call request forwarded from the second terminal or not according to the white list sent by the first terminal, the method may further include the following act. Under a condition that the judgment result is that the first terminal permits the reception of the call request forwarded from the second terminal, the call request is connected by taking the number of the first terminal as the call forwarding number to further implement call forwarding.

In addition, when it is needed to change the number for which the first terminal is permitted to be determined as the call forwarding destination, the white list may be updated within a preset time. There may also be other updating manners. For example, updating may be implemented according to a time period, or updating may also be performed according to a region.

In the embodiment of the present disclosure, before receiving the call request, the method may further include the following acts. A query request sent by a second HLR to which the second terminal belongs is received, where the query request is used for querying about whether the first terminal permits to be registered as the call forwarding destination by the second terminal or not. A query result is fed back to the second HLR according to the query request.

Specifically, the second HLR of the second terminal may send the query request used for querying about whether the first terminal permits to be registered as the call forwarding destination by the second terminal or not to the first HLR to which the first terminal belongs. In such a manner, when the second terminal requires call forwarding, if the call forwarding destination (i.e. the first terminal) does not permit forwarding, a forwarding request may not be directly sent to the first terminal, and instead, another forwarding destination is selected for forwarding, so that forwarding efficiency and success rate are favorably improved. In addition, the first HLR feeds back the query result to the second HLR according to the query request, so that privacy of a user is also ensured.

Figure 2:
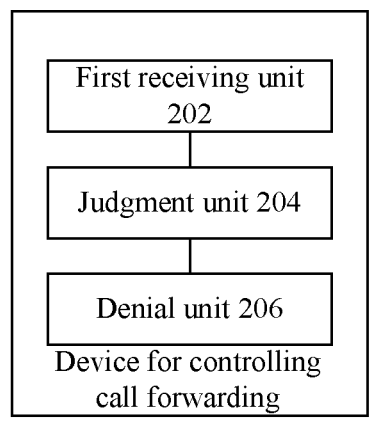
FIG. 2 is a structure diagram of a device for controlling call forwarding according to an embodiment of the present disclosure.

An embodiment of the present disclosure also provides a device for controlling call forwarding, which, as shown in FIG. 2, includes:

a first receiving unit 202, arranged to receive a call request, where the call request is sent when a second terminal takes a first terminal as a call forwarding destination;

a judgment unit 204, arranged to judge whether the first terminal permits reception of the call request forwarded from the second terminal or not; and a denial unit 206, arranged to deny the call request under a condition that a judgment result of the judgment unit 204 is that the first terminal does not permit the reception of the call request forwarded from the second terminal.

In the embodiment of the present disclosure, the device for controlling call forwarding may be applied to a first HLR. The first HLR to which the first terminal belongs may check whether the first terminal permits the reception of the call request forwarded from the second terminal or not when receiving the call request, where the call request is sent when the second terminal takes the first terminal as the call forwarding destination. When the result is that the first terminal does not permit the reception of the call request forwarded from the second terminal, the first HLR to which the first terminal belongs may deny the call request. Therefore, occurrence of the condition of malicious harassment caused by the second terminal to a contentious terminal is prevented.

In the embodiment of the present disclosure, the judgment unit 204 is further arranged to judge whether the first terminal permits the reception of the call request forwarded from the second terminal or not according to a white list sent by the first terminal. The white list may include one or more numbers for which a number of the first terminal is allowed to be set as a call forwarding number under a condition that the first terminal forbids call forwarding.

Specifically, the first terminal may set the white list in the first HLR to which the first terminal belongs to permit some numbers as exceptions, for which the number of the first terminal is permitted to be set as the call forwarding number under a condition that the first terminal forbids call forwarding. In this way, flexibility of a call forwarding forbidding service is improved.

Figure 3:
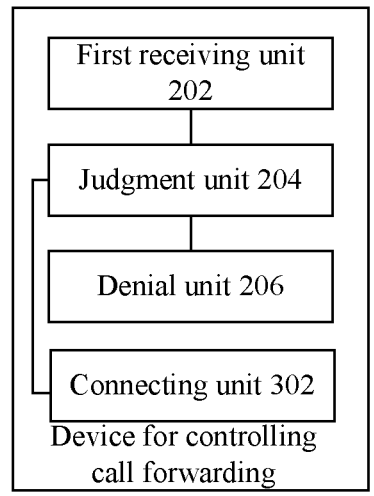
FIG. 3 is a structure diagram of another device for controlling call forwarding according to an embodiment of the present disclosure.

In the embodiment of the present disclosure, as shown in FIG. 3, the device for controlling call forwarding of the embodiment of the present disclosure may further include: a connecting unit 302, further arranged to connect, under a condition that the judgment result is that the first terminal permits the reception of the call request forwarded from the second terminal, the call request by taking the number of the first terminal as the call forwarding number to further implement call forwarding.

Figure 4:
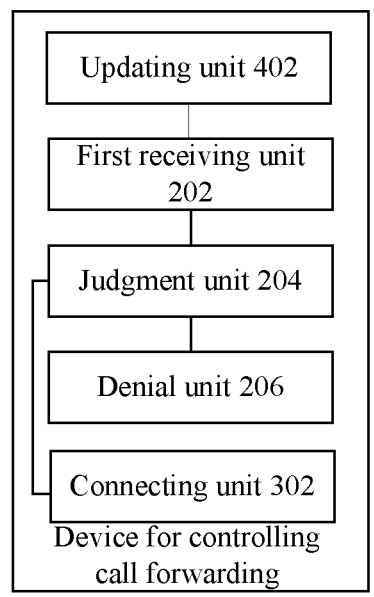
FIG. 4 is a structure diagram of another device for controlling call forwarding according to an embodiment of the present disclosure.

In the embodiment of the present disclosure, as shown in FIG. 4, the device for controlling call forwarding may further include: an updating unit 402, arranged to update the white list within a preset time.

Figure 5:
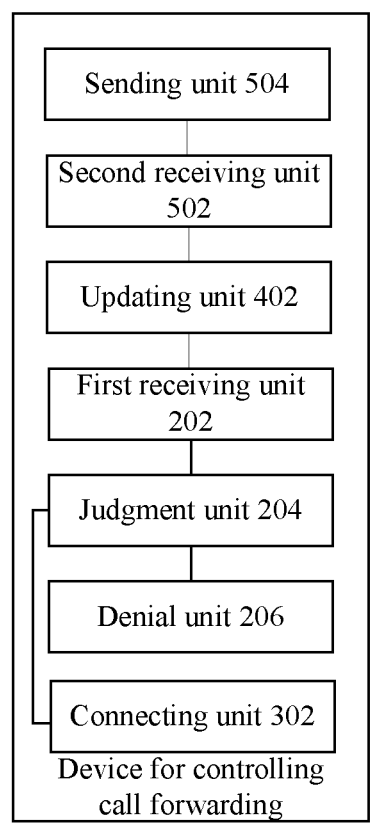
FIG. 5 is a structure diagram of another device for controlling call forwarding according to an embodiment of the present disclosure.

In the embodiment of the present disclosure, as shown in FIG. 5, the device for controlling call forwarding may further include:

a second receiving unit 502, arranged to receive a query request sent by a second HLR to which the second terminal belongs, where the query request is used for querying about whether the first terminal permits to be registered as the call forwarding destination by the second terminal or not; and a sending unit 504, arranged to feed back a query result to the second HLR according to the query request.

Specifically, the second HLR to which the second terminal belongs may send the query request used for querying about whether the first terminal permits to be registered as the call forwarding destination by the second terminal or not to the first HLR to which the first terminal belongs. The first HLR feeds back the query result to the second HLR according to the query request, so that privacy of a user is ensured.

By the embodiments of the present disclosure, whether the first terminal permits the reception of the call request forwarded from the second terminal or not is judged when the call request is received and the call request is denied under a condition that the judgment result is that the first terminal does not permit the reception of the call request forwarded from the second terminal. The problem of high malicious harassment rate due to the fact that no agreement or permission of others is required by call forwarding in the related call forwarding technology is solved, and effects of ensuring the privacy of the user and reducing harassments are further achieved.

In the embodiment of the present disclosure, a method for limiting unauthorized forwarding of another user to a mobile user is provided, that is, a user may autonomously control whether to permit the other users to register the number of this user as a forwarding number or not. After activating a call forwarding forbidding service, the user does not permit the other users to register forwarding to the user, so that a malicious scenario described in the background is prevented.

In order to achieve the purpose of the embodiment of the present disclosure, the embodiment of the present disclosure provides a method for limiting unauthorized forwarding of another user to a mobile user. The method is applied to control over a forwarding registration operation or call route acquisition of the user in an HLR by checking about whether the user permits to be registered as a forwarding party number or accept a forwarded call or not.

In the method for limiting the unauthorized forwarding of the other users to the mobile user, information of a call forwarding forbidding service of the user is required to be stored in the HLR to which the user belongs. When the service is marked to be an active state, it is indicated that the user does not permit to be registered as a forwarding number by the other users. In addition, as a further improvement, a white list or a blacklist may be set in the HLR to permit some numbers to register the user as their forwarding numbers even though the service is activated as exceptions.

A user A may activate or deactivate a call forwarding forbidding service through an Unstructured Supplementary Service data (USSD) request in a terminal (equivalent to the first terminal). After receiving the USSD service request, an HLR (equivalent to the first HLR) sets a subscription flag bit in a database according to a content of the request of the user.

When a user B tries to register an activated forwarding number to a number A through a terminal (equivalent to the second terminal), if receiving a forwarding number registration request, an HLR to which the user B belongs queries, to the HLR to which a registered forwarding number party A belongs, about whether the user A has activated the call forwarding forbidding service or not and whether the user A permits to be registered as the forwarding number by the user B or not. If the call forwarding forbidding service of the user A has been activated and the user A does not permit to be registered as the forwarding number by the user B, the HLR to which the user B belongs denies this forwarding number registration operation.

When the HLR to which the user A belongs receives a Send-Routing-Info (SRI) request of a called party, if the user A has activated the call forwarding forbidding service, and this call is a forwarded call and the user A does not permit reception of a call request forwarded from the user B, then the HLR to which the user A belongs denies this call routing request.

Compared with the related call forwarding technology, the method for limiting the unauthorized forwarding of the other users to the mobile user in the embodiment of the present disclosure may improve user experiences, ensure privacy of the user and prevent occurrence of malicious forwarding.

Figure 6:
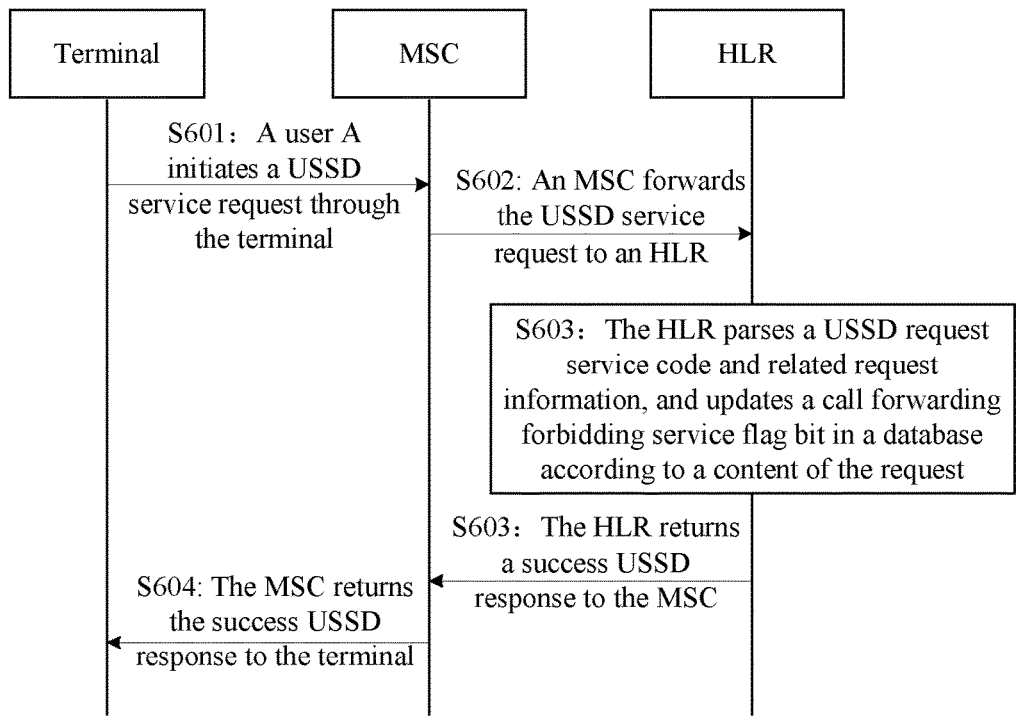
FIG. 6 is a flowchart of another method for controlling call forwarding according to an embodiment of the present disclosure.

As shown in FIG. 6, in the embodiment of the present disclosure, a call forwarding forbidding service flag bit of a user is stored in an HLR, and the user may activate (or deactivate) a call forwarding forbidding service through a USSD request. The method for controlling call forwarding may include the following acts.

At act S601, a user A initiates a USSD service request through a terminal, for example, activation of a call forwarding forbidding service.

At act S602, a Mobile Switching Center (MSC) forwards the USSD service request to an HLR.

At act S603, the HLR parses a USSD request service code and related request information, updates a call forwarding forbidding service flag bit in a database according to a content of the request, and returns a success USSD response to the MSC.

At act S604, the MSC returns the success USSD response to the terminal.

Figure 7:
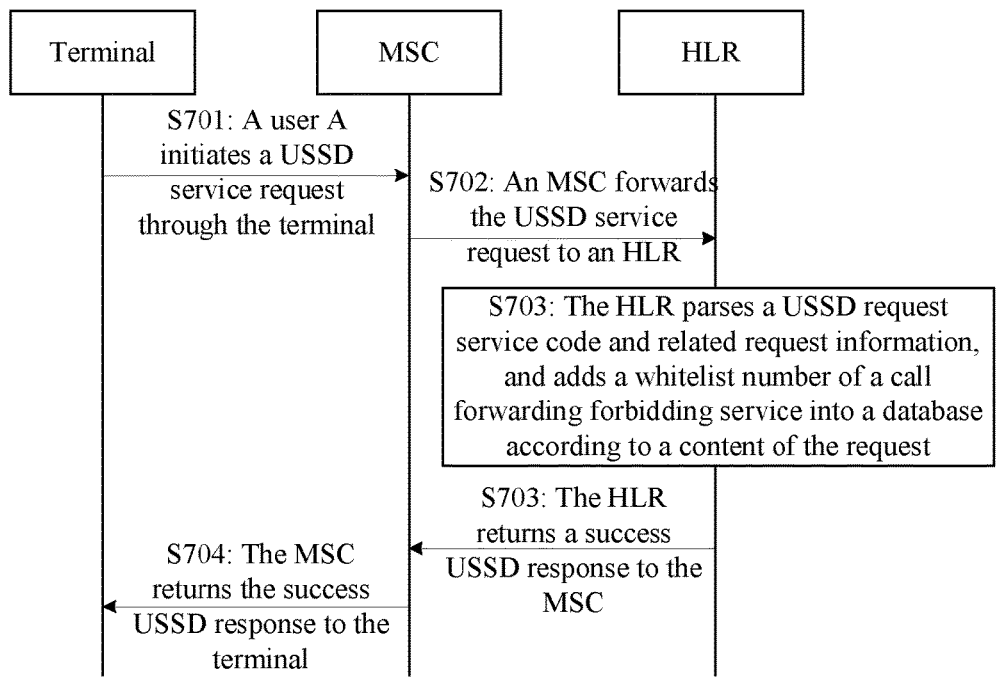
FIG. 7 is a flowchart of another method for controlling call forwarding according to an embodiment of the present disclosure.

As shown in FIG. 7, in the embodiment of the present disclosure, a white list or blacklist number list of a call forwarding forbidding service of a user is stored in an HLR, and the user may update (adds, deletes and modifies) white list or blacklist data through a USSD request. The method for controlling call forwarding may include the following acts.

At act S701, a user A initiates a USSD service request through a terminal, for example, requesting for addition of a white list number.

At act S702, an MSC forwards the USSD service request to an HLR.

At act S703, the HLR parses a USSD request service code and related request information, adds the white list number of a call forwarding forbidding service into a database according to a content of the request, and returns a success USSD response to the MSC.

At act S704, the MSC returns the success USSD response to the terminal.

Figure 8:
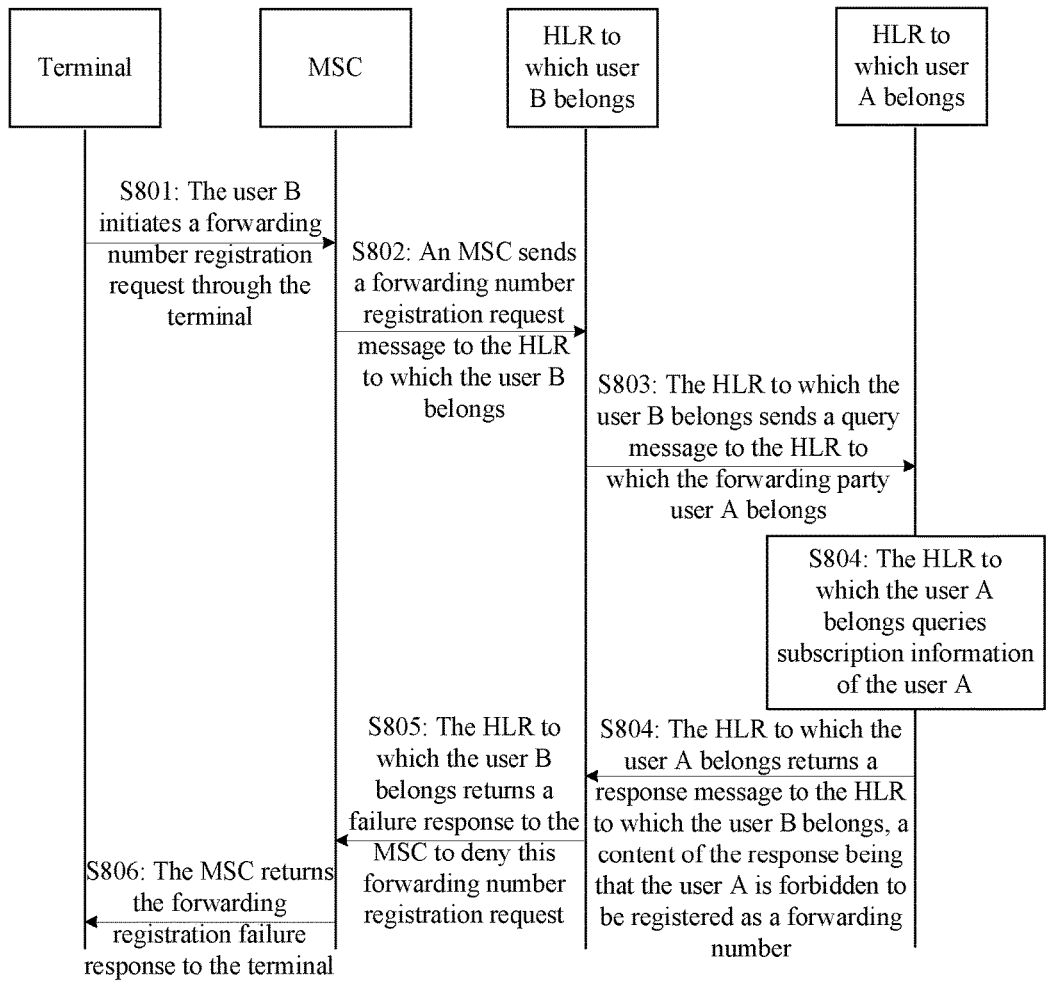
FIG. 8 is a flowchart of another method for controlling call forwarding according to an embodiment of the present disclosure.

As shown in FIG. 8, in the embodiment of the present disclosure, a flow that an HLR to which a user B belongs queries, to an HLR to which the registered forwarding party user A belongs, about whether a user A permits to be registered as a forwarding number or not when the user B registers the forwarding number and a result is that registration is not permitted includes the following acts.

At act S801, the user B initiates a forwarding number registration request through a terminal, such as CFU, a forwarding number being A.

At act S802, an MSC sends a forwarding number registration request message to the HLR to which the user B belongs.

At act S803, the HLR to which the user B belongs sends a query message to the HLR to which the forwarding party user A belongs to query about whether the user B permits the user A to be registered as the forwarding number or not, information of a number B being contained.

At act S804, the HLR to which the user A belongs queries subscription information of the user A, and confirms that the user A has activated a call forwarding forbidding service and the number B is not a white list number, and the HLR to which the user A belongs returns a response message to the HLR to which the user B belongs, a content of the response being that the user A is forbidden to be registered as the forwarding number.

At act S805, the HLR to which the user B belongs returns a failure response to the MSC to deny this forwarding number registration request.

At act S806, the MSC returns the forwarding registration failure response to the terminal.

Figure 9:
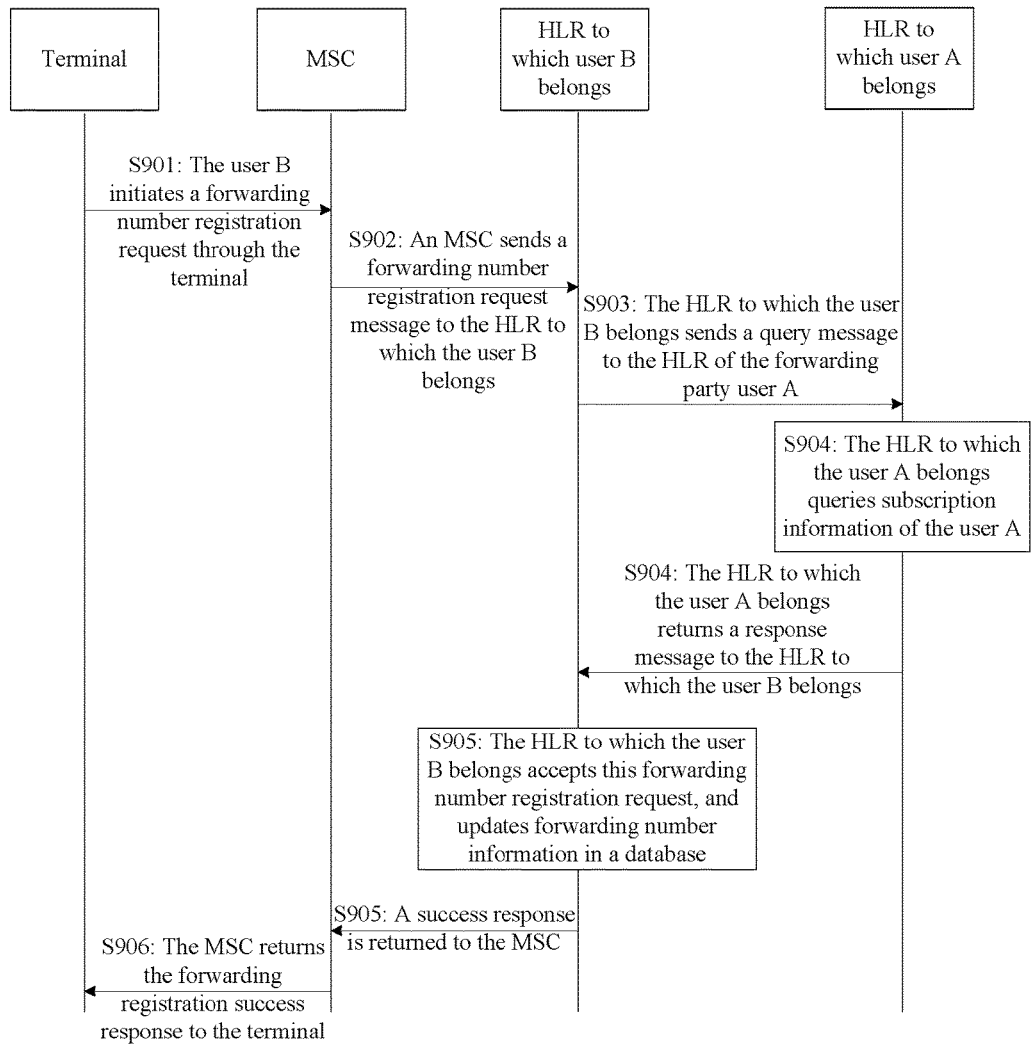
FIG. 9 is a flowchart of another method for controlling call forwarding according to an embodiment of the present disclosure.

As shown in FIG. 9, in the embodiment of the present disclosure, a flow that an HLR to which a user B belongs queries, to an HLR to which the registered forwarding party user A belongs, about whether a user A permits to be registered as a forwarding number or not when the user B registers the forwarding number and a result is that registration is permitted includes the following acts.

At act S901, the user B initiates a forwarding number registration request through a terminal, such as CFU, a forwarding number being A.

At act S902, an MSC sends a forwarding number registration request message to the HLR to which the user B belongs.

At act S903, the HLR to which the user B belongs sends a query message to the HLR to which the forwarding party user A belongs to query about whether the user B permits the user A to be registered as the forwarding number or not, information of a number B being contained.

At act S904, the HLR to which the user A belongs queries subscription information of the user A, and confirms that the user A has yet not activated a call forwarding forbidding service and the number B is a white list number, and the HLR to which the user A belongs returns a response message to the HLR to which the user B belongs, a content of the response being that the user A is permitted to be registered as the forwarding number.

At act S905, the HLR to which the user B belongs accepts this forwarding number registration request, updates forwarding number information in a database, and returns a success response to the MSC.

At act S906, the MSC returns the forwarding registration success response to the terminal.

Figure 10:
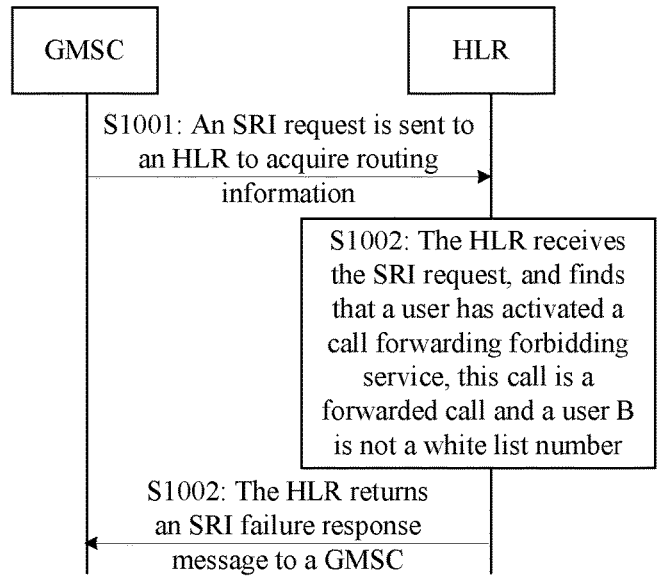
FIG. 10 is a flowchart of another method for controlling call forwarding according to an embodiment of the present disclosure.

As shown in FIG. 10, in the embodiment of the present disclosure, a flow that an HLR to which a user A belongs denies a call routing request if the user A has activated a call forwarding forbidding service, this call is a forwarded call and a number of a forwarding initiation party B is not a white list number when the HLR to which the user A belongs receives an SRI request of a called party includes the following acts.

At act S1001, a Gateway Mobile Switching Center (GMSC) receives a request of the called party, and sends the SRI request to the HLR to request for acquiring routing information, this call being a forwarded call and the GMSC containing a number of forwarding times and the number of the forwarding initiation party B in the SRI request.

At act S1002, the HLR receives the SRI request, and finds that the user has activated the call forwarding forbidding service, this call is the forwarded call and the user B is not a white list number, and the HLR returns an SRI failure response message to the GMSC to deny this call.

Figure 11:
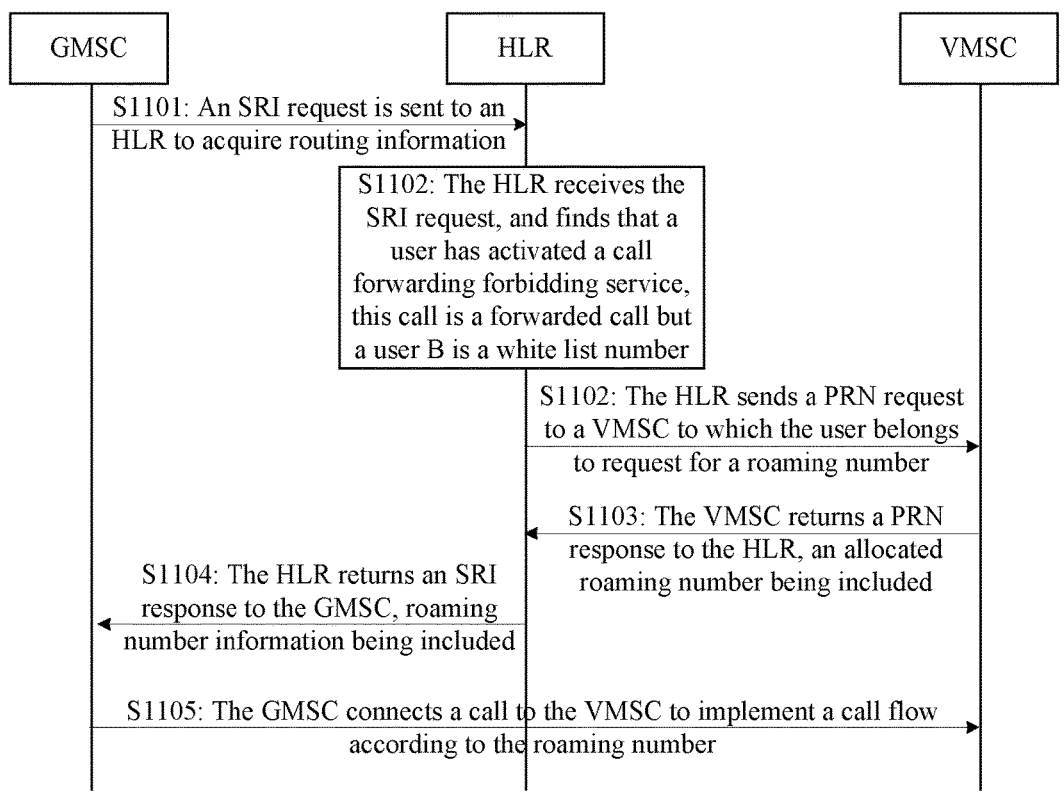
FIG. 11 is a flowchart of another method for controlling call forwarding according to an embodiment of the present disclosure.

As shown in FIG. 11, in the embodiment of the present disclosure, a flow that an HLR to which a user A belongs denies a call routing request if the user A has activated a call forwarding forbidding service, this call is a forwarded call and a number of a forwarding initiation party B is a white list number when the HLR to which the user A belongs receives an SRI request of a called party includes the following acts.

At act S1101, a GMSC receives a request of the called party, and sends the SRI request to the HLR to request for acquiring routing information, this call being a forwarded call and the GMSC containing a number of forwarding times and the number of the forwarding initiation party B in the SRI request.

At act S1102, the HLR receives the SRI request, and finds that the user has activated the call forwarding forbidding service, this call is the forwarded call and the user B is a white list number, and the HLR sends a Provide Roaming Number (PRN) request to a Visited Mobile-services Switching Center (VMSC) to which the user belongs to request for a roaming number.

At act S1103, the VMSC returns a PRN response to the HLR, an allocated Mobile Station Roaming Number (MSRN) being included.

At act S1104, the HLR returns an SRI response to the GMSC, roaming number information being included.

At act S1105, the GMSC connects a call to the VMSC to implement a call flow according to the roaming number.

Obviously, those skilled in the art should know that each module or each step of the present disclosure may be implemented by a universal computing device, and the modules or acts may be concentrated on a single computing device or distributed on a network formed by a plurality of computing devices, and may optionally be implemented by program codes executable for the computing devices, so that the modules or acts may be stored in a storage device for execution with the computing devices, the shown or described acts may be executed in sequences different from those described here in some circumstances, or may form each integrated circuit module respectively, or multiple modules or acts therein may form a single integrated circuit module for implementation. As a consequence, the present disclosure is not limited to any specific hardware and software combination.

The above is only the preferred embodiment of the present disclosure and not intended to limit the present disclosure. For those skilled in the art, the present disclosure may have various modifications and variations. Any modifications, equivalent replacements, improvements and the like made within the principle of the present disclosure shall fall within the scope of protection defined by the appended claims of the present disclosure.

INDUSTRIAL APPLICABILITY

The technical solutions provided by the embodiments of the present disclosure may be applied to a call forwarding control process. Whether the first terminal permits reception of the call request forwarded from the second terminal or not is judged when the call request is received and the call request is denied under a condition that the judgment result is that the first terminal does not permit the reception of the call request forwarded from the second terminal. The problem of high malicious harassment rate due to the fact that no agreement or permission of others is required by call forwarding in the related call forwarding technology is solved, and an effect of reducing harassments is further achieved.

What is claimed is:

1. A method for controlling call forwarding, comprising:
receiving a call request, wherein the call request is sent when a second terminal takes a first terminal as a call forwarding destination;
judging whether the first terminal permits reception of the call request forwarded from the second terminal or not; and
under a condition that a judgment result is that the first terminal does not permit the reception of the call request forwarded from the second terminal, denying the call request;
wherein judging whether the first terminal permits the reception of the call request forwarded from the second terminal or not comprises: judging whether the first terminal permits the reception of the call request forwarded from the second terminal or not according to a white list or black list sent by the first terminal, wherein the white list comprises one or more numbers for which a number of the first terminal is allowed to be set as a call forwarding number under a condition that the first terminal forbids call forwarding, or the black list comprises one or more numbers for which a number of the first terminal is not allowed to be set as a call forwarding number under a condition that the first terminal forbids call forwarding, wherein the query request is sent by the second HLR to which the second terminal belongs upon receiving a forwarding number registration request from the second terminal; wherein the white list or black list is updated within a preset time or according to a region.

2. The method for controlling call forwarding as claimed in claim 1, after judging whether the first terminal permits the reception of the call request forwarded from the second terminal or not according to the white list or black list sent by the first terminal, further comprising:
under a condition that the judgment result is that the first terminal permits the reception of the call request forwarded from the second terminal, connecting the call request by taking the number of the first terminal as the call forwarding number.

3. The method for controlling call forwarding as claimed in claim 1, before receiving the call request, further comprising:
receiving a query request sent by a second Home Location Register (HLR) to which the second terminal belongs, wherein the query request is used for querying about whether the first terminal permits to be registered as the call forwarding destination by the second terminal or not; and
feeding back a query result to the second HLR according to the query request.

4. A device for controlling call forwarding, comprising a hardware processor arranged to execute program units comprising:
a first receiving unit, arranged to receive a call request, wherein the call request is sent when a second terminal takes a first terminal as a call forwarding destination;
a judgment unit, arranged to judge whether the first terminal permits reception of the call request forwarded from the second terminal or not, wherein the judgment unit is further arranged to judge whether the first terminal permits the reception of the call request forwarded from the second terminal or not according to a white list or black list sent by the first terminal, wherein the white list comprises one or more numbers for which a number of the first terminal is allowed to be set as a call forwarding number under a condition that the first terminal forbids call forwarding, or the black list comprises one or more numbers for which a number of the first terminal is not allowed to be set as a call forwarding number under a condition that the first terminal forbids call forwarding, wherein the query request is sent by the second HLR to which the second terminal belongs upon receiving a forwarding number registration request from the second terminal; and a denial unit, arranged to deny the call request under a condition that a judgment result of the judgment unit is that the first terminal does not permit the reception of the call request forwarded from the second terminal;

an updating unit, arranged to update the white list or black list within a preset time or according to a region.

5. The device for controlling call forwarding as claimed in claim 4, wherein the hardware processor is further arranged to execute program units comprising:

a connecting unit, further arranged to connect, under a condition that the judgment result of the judgment unit is that the first terminal permits the reception of the call request forwarded from the second terminal, the call request by taking the number of the first terminal as the call forwarding number.

6. The device for controlling call forwarding as claimed in claim 4, wherein the hardware processor is further arranged to execute program units comprising:

a second receiving unit, arranged to receive a query request sent by a second Home Location Register (HLR) to which the second terminal belongs, wherein the query request is used for querying about whether the first terminal permits to be registered as the call forwarding destination by the second terminal or not; and a sending unit, arranged to feed back a query result to the second HLR according to the query request.

7. The method for controlling call forwarding as claimed in claim 2, wherein the white list or black list is updated within a preset time.

8. The method for controlling call forwarding as claimed in claim 1, wherein judging whether the first terminal permits the reception of the call request forwarded from the second terminal or not comprises:

when all forwarded calls are denied, upon judging the call request to be a forwarded call, directly judging that the first terminal does not permit the reception of the call request forwarded from the second terminal.

9. The method for controlling call forwarding as claimed in claim 8, wherein denying the call request comprises:

feeding back a denial message.

10. The method for controlling call forwarding as claimed in claim 1, wherein the white list or black list sent by the first terminal is set in a first Home Location Register (HLR) to which the first terminal belongs.

11. The method for controlling call forwarding as claimed in claim 3, wherein the white list or black list sent by the first terminal is set in a first HLR to which the first terminal belongs.

12. The method for controlling call forwarding as claimed in claim 11, wherein receiving the query request sent by the second HLR to which the second terminal belongs comprises:
receiving, by the first HLR to which the first terminal belongs, the query request sent by the second HLR to which the second terminal belongs;

feeding back the query result to the second HLR according to the query request comprises:
feeding back, by the first HLR to which the first terminal belongs, the query result to the second HLR according to the query request.

13. The method for controlling call forwarding as claimed in claim 1, before judging whether the first terminal permits the reception of the call request forwarded from the second terminal or not, further comprising:

receiving, by a first Home Location Register (HLR) to which the first terminal belongs, an Unstructured Supplementary Service data (USSD) request for activating or deactivating a call forwarding forbidding service from the first terminal;

setting, by the first HLR to which the first terminal belongs, a subscription flag bit in a database according to a content of the USSD request.

14. The method for controlling call forwarding as claimed in claim 1, wherein when the query result indicates that the first terminal does not permit to be registered as the call forwarding destination by the second terminal, the second HLR to which the second terminal belongs denies a forwarding number registration operation requested by the forwarding number registration request.

15. The device for controlling call forwarding as claimed in claim 5, wherein the hardware processor is further arranged to execute program units comprising:

an updating unit, arranged to update the white list or black list within a preset time.

* * * * *